Feb. 4, 1930.　　　J. W. GREENBOWE　　　1,745,928
COIL FORMING DIE
Filed Dec. 16, 1927
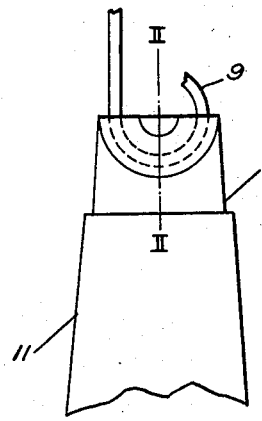
FIG.1.
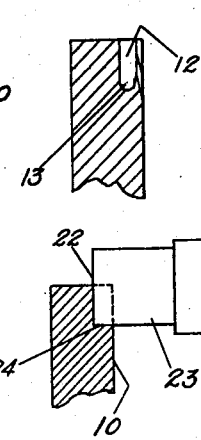
FIG.2.
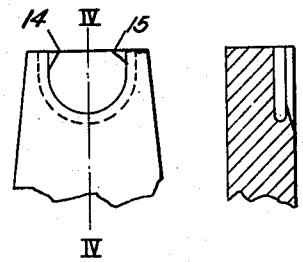
FIG.3. FIG.4.
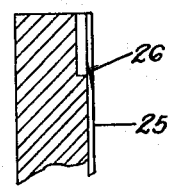
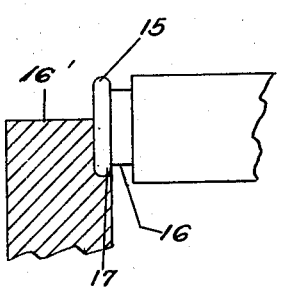
FIG.5.
FIG.9.
FIG.6.
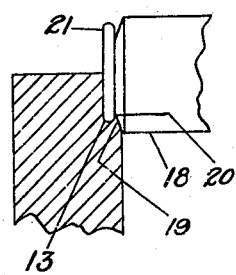
FIG.7.
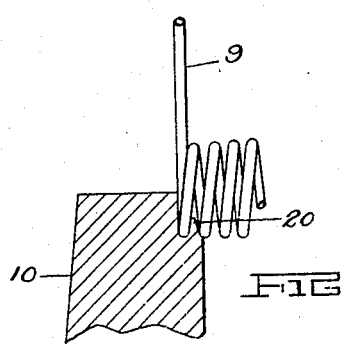
FIG.8.
INVENTOR
J.W.GREENBOWE
BY
ATTORNEY Patented Feb. 4, 1930

1,745,928

UNITED STATES PATENT OFFICE

JAMES WALTER GREENBOWE, OF NEWARK, NEW JERSEY, ASSIGNOR TO WESTINGHOUSE LAMP COMPANY, A CORPORATION OF PENNSYLVANIA

COIL-FORMING DIE

Application filed December 16, 1927. Serial No. 240,460.

This invention relates to the manufacture of finely coiled helical wire for the production of lamp filaments, and more particularly to a die employed for effecting the winding of such filaments.

As set forth in application Serial No. 104,264 filed April 24, 1926, for coil-forming die and method of making the same, which application was assigned to the same assignee as is the present application, a lamp filament forming die is shown and described in which a fine hair-like wire is driven into the die and which issues in the form of a series of coils to produce a helix. The die shown in the said copending application is produced by forming a cavity in a diamond block or other wear-resisting material such as a sapphire or in steel or other metal. The cavity is produced in one surface of the block and adjacent to an edge thereof. The edge of the block serves as a lip for guiding convolutions into spaced relation as they issue from the cavity. This form of die has been used and satisfactory results obtained therefrom.

In the manufacture of dies for coil-winding purposes, particularly dies produced from a diamond block, it is necessary to accurately cut the cavity and by reason of the hardness of the material a comparatively long time period is necessary in producing a cavity to the required depth. In the form of die heretofore proposed, the cavity was formed by means of a lapping wheel and the lapping wheel removed sufficient material from the diamond block so as to produce a cavity substantially equal in depth to half the diameter of the lapping wheel. The depth of the cavity was, however, limited by reason of the shank of the shaft of the lapping wheel which, although of as small a diameter as possible, prevented the wheel from entering the diamond block further than less than half the diameter of the wheel. A die produced in this manner resulted in a coil-winding die comprised of a diamond block having a cavity of an elongated perimeter at its mouth. The cavity was disposed lengthwise and substantially parallel to an edge of a diamond block, the edges of the mouth of the cavity being straight and one edge of the mouth serving as a lip for the separation of the convolutions of wire issuing from the cavity. This resulted in a lip having an effective dimension substantially equal to half the diameter of the coil to be wound. Certain difficulties arise in maintaining a lip of this character by reason of the minute dimensions thereof.

It has been found that the lip for separating the coils may be made so as to be equal in height to only a small portion of the diameter of the coil to be wound. Furthermore, it has been found that a cavity of such dimensions might be employed in which a tool having an enlarged shank could be used, since the elimination of the extended lip permits the use of a shank which will grind away the lip to the proper degree during the formation of the cavity.

An object of the present invention is to produce a coil-winding die consisting of a block of wear-resisting material of simplified form.

Another object of the invention is to produce a coil-winding die having a guide slot so arranged as to facilitate the manufacture of the die.

Other objects and advantages of the invention will be apparent as the description proceeds.

Coiled incandescent electric lamp filaments are usually produced from wire such as tungsten which presents conditions and problems not found in connection with the winding of wire or other materials, as for example, in the manufacture of the usual commercial helical springs or the like.

When producing a coiled filament of 60 watts, for example, it is necessary to employ a wire of .0025 and to coil the wire into a helix of about 563 turns so as to contain a given length of wire. It is also important to maintain a uniform pitch throughout the winding of the coil to avoid differences in diameter when the coil is heated to incandescence during use as a lamp filament.

From the foregoing, it will be appreciated that the winding of a lamp filament presents many difficulties and in order to produce lamp filaments at a cost comparable to the manufacture of other lamp parts, it is necessary to effect the helical winding of the wire at a high rate of speed. For example, a filament for a lamp of 60 watts and 115 volts requires a given length of filament having 400 turns per inch, and in order to produce such a filament at a profitable rate, it is desirable to wind this extremely fine filament wire somewhere in the neighborhood of 10,000 turns per minute. In the winding of a filament by the use of a cavity die, it will readily be appreciated from the foregoing that in order to attain the desired accuracy of pitch at the rate of speed which the wire is wound, it is essential to have a die so formed as to give the greatest degree of accuracy and to facilitate the movement of the wire to cause its diversion from a given path which results in the bending of the wire to helical form.

The present invention provides what may be termed a die block formed from a suitable wear-resisting material such as a sapphire, diamond, or a metal as steel. It has been found preferable to employ a diamond by reason of its hardness.

In producing a die in accordance with the present invention, an aperture is produced upon one side of a diamond block to provide a ledge. This ledge may be of arcuate shape from end to end and may have its bottom portion rounded in transverse cross-section. The rounded bottom portion of the ledge is preferably made with a radius slightly greater than the radius of the wire to be wound. The wall of the block at one side of the ledge serves as a guide, while the outer edge of the ledge may be ground to provide a lip or knife-like edge inclined downwardly and outwardly from the die. This edge or separator lip, as it may be called, serves to give the proper spacing to the turns of wire when the same is wound.

In the present construction, the lip may be so formed as to extend only a comparatively short distance above the bottom of the ledge. This makes it possible to obtain a comparatively rugged separator lip with greater strength than has heretofore been possible. The formation of the cavity, that is, the method of grinding, lapping, etc., may be followed in generally the same manner as set forth in the above-mentioned copending application. The present form of die, however, simplifies such grinding and lapping operation, giving a more rugged and lasting article.

The invention will be more fully understood by reference to the accompanying drawing, in which:

Fig. 1 shows an elevational view of a diamond block having a recess formed at one side thereof;

Fig. 2 is a sectional view taken on line II—II in Fig. 1;

Fig. 3 is an elevational view of a diamond block such as shown in Fig. 2, but illustrates a cavity of greater depth than that shown in Fig. 1;

Fig. 4 is a sectional view taken on line IV—IV in Fig. 3;

Fig. 5 is a sectional view of a diamond block showing a tool for grinding a ledge without a groove therein;

Fig. 6 is a sectional view of a diamond block showing a lapping tool in place for forming a recess;

Fig. 7 is a sectional view of a diamond block showing a tool in place for grinding the edge of the ledge formed by the tool shown in Fig. 6;

Fig. 8 is a sectional view of a diamond block showing a wire issuing therefrom in a series of convolutions; and Fig. 9 is a sectional view of a diamond block showing the lip or separator edge in the form of a separate member.

The present coil-bending die may, as shown, comprise a die block 10 of a hard material such as a diamond. This die block may be secured to the end of a holder or die rod 11 in any suitable manner as by brazing the end of the rod about the block. It is to be understood that the various views of the die and other tools shown in the drawing are drawn on an enlarged scale for the sake of clearness, but that the actual dies for the purpose set forth have exceedingly small dimensions.

The diamond block 10 may have a groove or slot 12 formed in one side thereof. The bottom 13 of this slot, which may be termed a ridge or ledge, may be arcuate from end to end and the said bottom may be semicircular in transverse cross-section as shown in Fig. 2. The radius of curvature of said bottom of the ridge is preferably slightly greater than the radius of the wire 9 to be wound. The radius of curvature of the ridge lengthwise is preferably about the same as the radius of the coils of the wound wire although this curve may vary, since the position of the die with respect to the incoming wire largely determines the diameter of the issuing coils.

Although the bottom 13 of the ridge may be made a half circle in longitudinal cross-section as shown in Figs. 1 and 2; it is possible with the present construction to produce a die as shown in Figs. 3 and 4 in which the ends 14 and 15 of the bottom of the ridge are extended, thus providing a deeper or longer guide for the wire. This prevents the wire from escaping from the die during the coil-winding operation.

The importance of this form of guide is evident since the wire must be driven into the die at high speed to attain the necessary rate of production. With a die as above described, the speed of the coil-winding operation can be maintained without loss of time due to the wire escaping and requiring reapplication to the die as had heretofore occurred. It will be understood that only by reason of the present construction is it possible to obtain a long guide since as shown in Fig. 6, when forming the ridge, a lapping wheel 15 may be employed having a shank 16 of relatively large diameter and this wheel may grind the die until the axis of rotation of the wheel is below the surface 16' of the block. The shank 16 may at the same time grind the edge of the ledge to provide a lip or separator edge 17. This lip may then be beveled by a tool 18 (as shown in Fig. 7) to provide an inclined surface 19 resulting in a sharp knife-like portion 20. If desirable, the tool 18 may have a circular head 21 as a guide, or the head and surface 19 may be charged with diamond dust so that the operation of forming the ledge 13 and the lip 17 may be accomplished in one operation by the lapping wheel which may be rotated at high speed in the usual manner.

It will be noted that the thickness of the lip 17 is relatively great with respect of its height, thus giving strength which is important particularly when the die is made from a diamond since the long thin lip as heretofore employed is often chipped off resulting in an irregular edge. The lip or edge 20 as shown in Fig. 8 may extend upwardly a distance less than the diameter of the wire being wound, since it has been found that this lip is sufficient to separate the turns as they issue from the die.

Although the ridge 13 may be formed by the tool 15 and the tool 18 or by the tool 18 alone, the ridge may be produced by applying an end 22 of a tool 23 to one side of a diamond block 10. The end 22 of the tool may be charged with diamond dust and the tool rotated in the usual manner to produce a ridge 24 having a straight bottom portion. This ledge may be used without being rounded by employing a plate 25 as shown in Fig. 9. The plate 25 may be so shaped as to provide a lip 26, and the said lip may be renewed when worn by a renewal of the plate. It will also be understood that the tool shown in Fig. 5 may be employed to form a ledge, and a tool such as that shown in Fig. 6 may be then used to give the ledge the rounded bottom and provide a lip 17.

The present construction of die has been found to be more effective in the winding of a wire to helical form and more simple to make.

The production of diamond dies for the above purpose is a time-consuming and laborious operation, and the present construction offers a die of such construction as to facilitate the grinding or lapping operation and one which is more advantageous from a practical standpoint.

Although a preferred embodiment of the invention is shown and described herein, it is to be understood that modifications may be made therein without departing from the spirit and scope of the invention as set forth in the appended claims.

What is claimed is:
1. A coil-winding die comprising a diamond block having an arcuate grooved ledge on one side thereof.
2. A coil-winding die comprising a body having an aperture formed in one side thereof to provide a ledge and a groove in said ledge.

In testimony whereof, I have hereunto subscribed my name this 15th day of December, 1927.

JAMES WALTER GREENBOWE.